US012598277B2

(12) United States Patent
Qi et al.

(10) Patent No.: US 12,598,277 B2
(45) Date of Patent: Apr. 7, 2026

(54) METHOD FOR ADJUSTING PROJECTION SYSTEM AND PROJECTION SYSTEM

(71) Applicant: Coretronic Projection (Kunshan) Corporation, Jiangsu (CN)

(72) Inventors: Zhiqing Qi, Jiangsu (CN); Gang Li, Jiangsu (CN)

(73) Assignee: Coretronic Projection (Kunshan) Corporation, Jiangsu (CN)

( * ) Notice: Subject to any disclaimer, the term of this patent is extended or adjusted under 35 U.S.C. 154(b) by 405 days.

(21) Appl. No.: 18/475,260

(22) Filed: Sep. 27, 2023

(65) Prior Publication Data

US 2024/0114117 A1     Apr. 4, 2024

(30) Foreign Application Priority Data

Sep. 30, 2022    (CN) .......................... 202211210101.2

(51) Int. Cl.
*H04N 9/31*        (2006.01)
*G06T 7/13*        (2017.01)
*G06T 7/80*        (2017.01)

(52) U.S. Cl.
CPC ............. *H04N 9/3155* (2013.01); *G06T 7/13* (2017.01); *G06T 7/80* (2017.01); *H04N 9/3179* (2013.01)

(58) Field of Classification Search
CPC .. H04N 9/3152; H04N 9/3155; H04N 9/3158; H04N 9/3179; H04N 9/3182; H04N 9/3185; H04N 9/3188; H04N 9/3194; G03B 21/13; G03B 21/145; G03B 21/147; G03B 21/2006; G03B 21/2053; G06T 7/13; G06T 7/80; G06V 10/50; G06V 10/141; G06V 2201/07
See application file for complete search history.

(56) References Cited

U.S. PATENT DOCUMENTS

2013/0258116 A1* 10/2013 Chang .................. H04N 9/3179
                                                        348/188
2020/0177854 A1    6/2020 Miao
2020/0177855 A1    6/2020 Miao et al.
2020/0366877 A1* 11/2020 Cheng .................. H04N 9/3194
2022/0021856 A1*  1/2022 Nakamura ............. G03B 21/00

FOREIGN PATENT DOCUMENTS

CN        111258157       6/2020
CN        111258158       6/2020

* cited by examiner

*Primary Examiner* — Sultan Chowdhury
(74) *Attorney, Agent, or Firm* — JCIPRNET

(57) ABSTRACT

A method for adjusting a projection device and a projection system are provided. A projection device is driven to project an image on a projection target. An image-capturing device is driven to perform image capturing toward the projection target to obtain a captured image. The captured image includes a target object corresponding to the image. A projection position of the target object in the captured image is calculated based on the target object and the captured image. An output power of an illumination light source module of the projection device is adjusted based on the projection position and an ambient luminance.

16 Claims, 7 Drawing Sheets

610a

620

610b

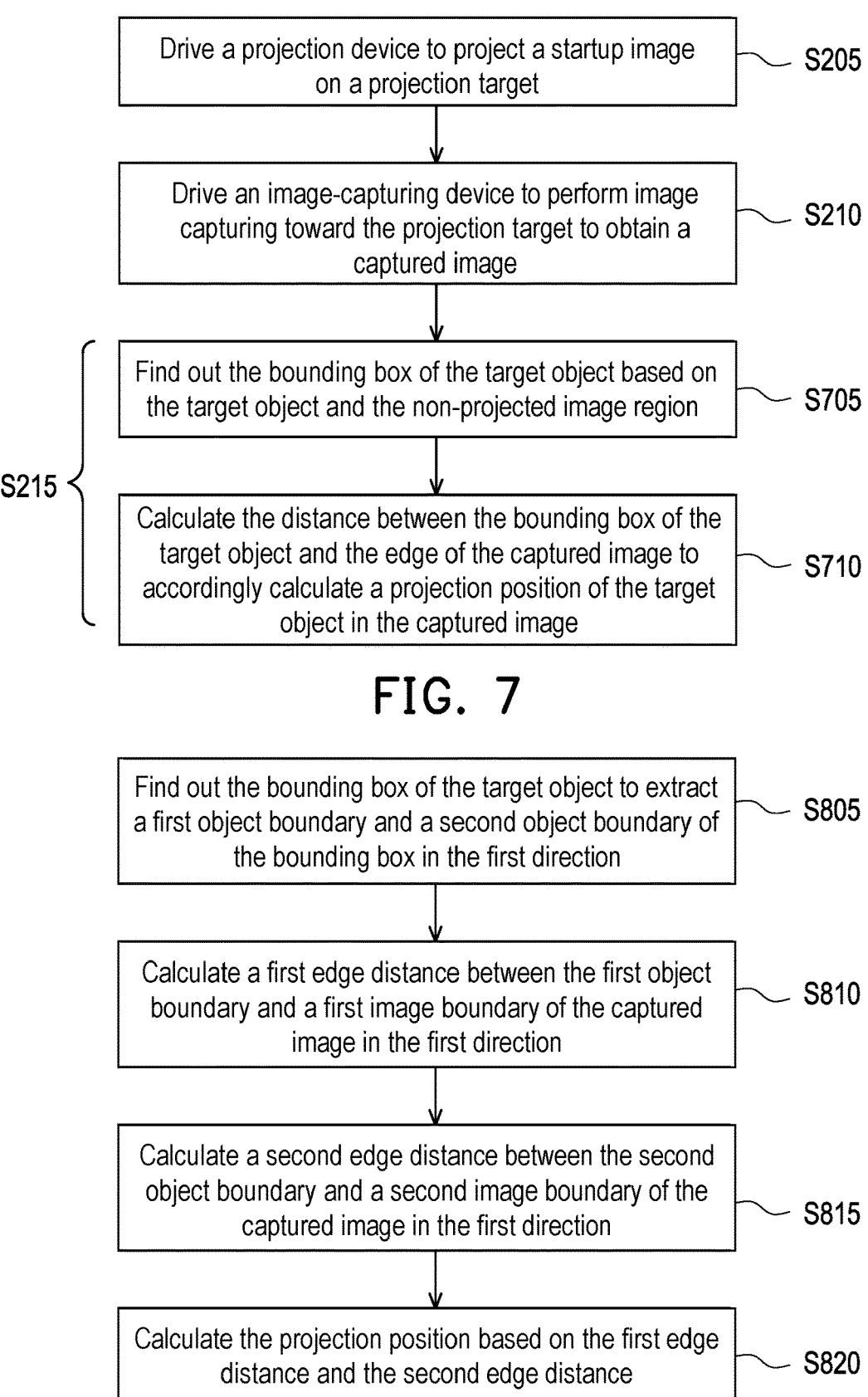

Drive a projection device to project a startup image on a projection target — S205

Drive an image-capturing device to perform image capturing toward the projection target to obtain a captured image — S210

S215

Find out the bounding box of the target object based on the target object and the non-projected image region — S705

Calculate the distance between the bounding box of the target object and the edge of the captured image to accordingly calculate a projection position of the target object in the captured image — S710

FIG. 7

Find out the bounding box of the target object to extract a first object boundary and a second object boundary of the bounding box in the first direction — S805

Calculate a first edge distance between the first object boundary and a first image boundary of the captured image in the first direction — S810

Calculate a second edge distance between the second object boundary and a second image boundary of the captured image in the first direction — S815

Calculate the projection position based on the first edge distance and the second edge distance — S820

METHOD FOR ADJUSTING PROJECTION SYSTEM AND PROJECTION SYSTEM

CROSS-REFERENCE TO RELATED APPLICATION

This application claims the priority benefit of China application no. 202211210101.2, filed on Sep. 30, 2022. The entirety of the above-mentioned patent application is hereby incorporated by reference herein and made a part of this specification.

BACKGROUND

Technical Field

The disclosure relates to a projection system. Particularly, the disclosure relates to a method for adjusting a projection system and a projection system.

Description of Related Art

With the development of projectors, visual comfort receives increasing attention. Facing excessively bright or excessively dark projected images for a long time is likely to results in eye fatigue or damage to vision, and affect viewing effects of projected images. In the current projector market, an increasing amount of equipment is added with light-sensing functions. For example, in the projector, a light sensor is added to detect luminance of an ambient light, so as to automatically adjust output luminance of images of the projector to improve viewing comfort for users.

In addition, in general, when the projected image of the projector is relatively small, the luminance of the projected image may be relatively bright, and when the projected image of the projector is relatively large, the luminance of the projected image may be relatively dark. If users view the projected image for a long time, eye fatigue and adversely affected viewing experiences may also result. However, the existing automatic light adjustment technology only considers intensity of the ambient light without considering impact of the size of a projected image on perception of users.

Accordingly, the existing automatic light adjustment mechanism cannot adjust a projection luminance of the projector to an appropriate luminance for circumstances where the ambient light is strong and the projected image is relatively small and circumstances where the ambient light is weak and the projected image is relatively large.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a method for adjusting a projection system and a projection system, which automatically adjust output luminance of a projection device according to an ambient light and the size of a projected image.

Other purposes and advantages of the disclosure may be further understood from the technical features disclosed by the embodiments of the disclosure.

To achieve one, some, or all of the above purposes or other purposes, a method for adjusting a projection system of an embodiment of the disclosure includes the following. A projection device is driven to project an image on a projection target. An image-capturing device is driven to perform image capturing toward the projection target to obtain a captured image. The captured image includes a target object corresponding to the image. A projection position of the target object in the captured image is calculated based on the target object and the captured image. An output power of an illumination light source module of the projection device is adjusted based on the projection position and an ambient luminance.

A projection system of an embodiment of the disclosure includes a projection device, an image-capturing device, and a processing unit. The projection device includes an illumination light source module. The projection device is used for projection on a projection target. The image-capturing device is used for performing image capturing toward the projection target. The processing unit is coupled to the projection device and the image-capturing device. The processing unit is used to: drive the projection device to project an image on the projection target; drive the image-capturing device to perform image capturing toward the projection target to obtain a captured image that includes a target object corresponding to the image; calculate a projection position of the target object in the captured image based on the target object and the captured image; and adjust an output power of the illumination light source module of the projection device based on the projection position and an ambient luminance.

Based on the foregoing, in the disclosure, detection of the size of the projected image is additionally determined on the basis of detection of the ambient luminance, achieving a relatively optimized automatic adjustment mechanism of the image luminance.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7 is a flowchart of calculating a projection position of a target object according to an embodiment of the disclosure.

FIG. 8 is a flowchart of calculating a projection position according to an embodiment of the disclosure.

DESCRIPTION OF THE EMBODIMENTS

The aforementioned and other technical contents, features, and effects of the disclosure will be clearly presented in the following detailed description of one of the preferred embodiments with reference to the drawings. The directional terms mentioned in the following embodiments, such as: up, down, left, right, front, back, or the like, are only referring to the directions of the accompanied drawings. Accordingly, the directional terms are used for describing instead of limiting the disclosure.

It is to be understood that other embodiment may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
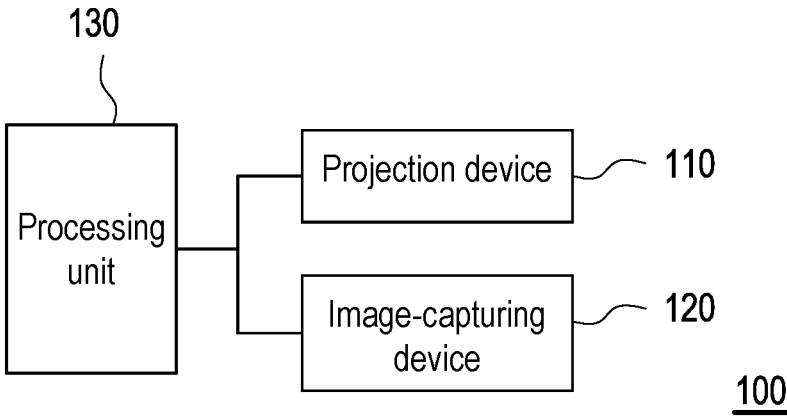
FIG. 1 is a block diagram of a projection system according to an embodiment of the disclosure.
Figure 3A:
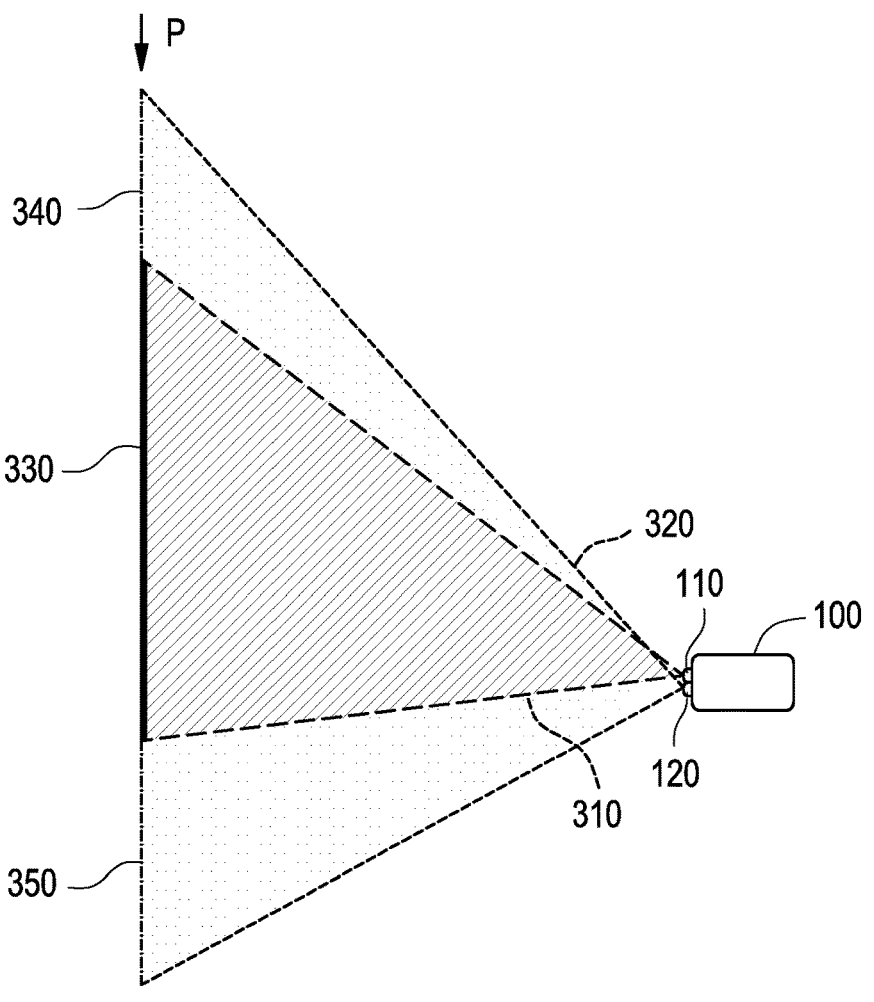
FIG. 3A is a schematic side view of a projection range and a capturing range according to an embodiment of the disclosure.

FIG. 1 is a block diagram of a projection system according to an embodiment of the disclosure. With reference to FIG. 1, a projection system 100 includes a projection device 110, an image-capturing device 120, and a processing unit 130. The processing unit 130 is coupled to the projection device 110 and the image-capturing device 120. The projection device 110 is used for projecting image on a projection target P (e.g., projection plane, as shown in FIG. 3A). The image-capturing device 120 performs image capturing toward the projection target.

The projection device 110 includes physical hardware members, for example, a projection lens, an illumination light source module, and an optical engine module. The image-capturing device 120 may be a video camera, a photographic camera, or the like, which adopts a charge coupled device (CCD) or a complementary metal oxide semiconductor transistors (CMOS). The image-capturing device 120 may be a device obtaining a visible light image or an infrared light image. In an embodiment, the image-capturing device 120 may be a member integrated into the projection device 110 or another member independent of the projection device 110.

The processing unit 130 is, for example, a central processing unit (CPU), a physics processing unit (PPU), a programmable microprocessor, an embedded control chip, a digital signal processor (DSP), an application specific integrated circuit (ASIC), or other similar devices. The processing unit 130 may drive the projection device 110 to project, and may drive the image-capturing device 120 to perform image capturing. In an embodiment, the processing unit 130 may be a member integrated into the projection device 110 or another member independent of the projection device 110.

Figure 2:
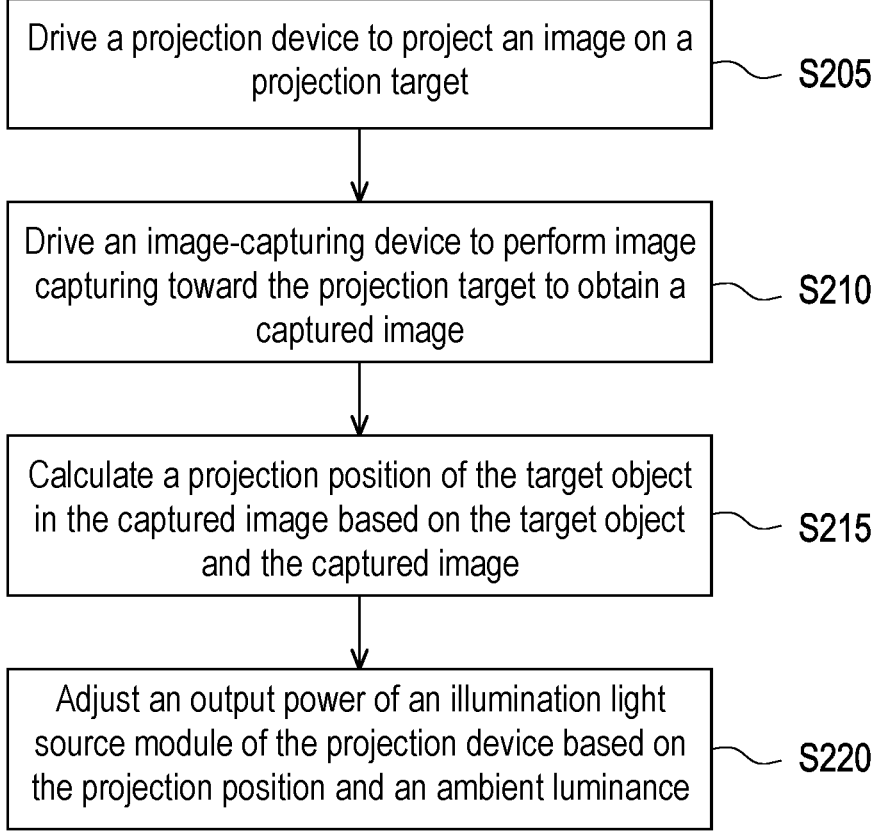
FIG. 2 is a flowchart of a method for adjusting a projection system according to an embodiment of the disclosure.

FIG. 2 is a flowchart of a method for adjusting a projection system according to an embodiment of the disclosure. With reference to FIG. 1 and FIG. 2, in step S205, the projection device 110 is driven to project an image on a projection target. The projected image may be a startup image during a startup process, and may also be a calibration image in a calibration mode of the projection device 110. The image may be a visible light image or an infrared light image.

Next, in step S210, the image-capturing device 120 is driven to perform image capturing toward the projection target to obtain a captured image.

Figure 3B:
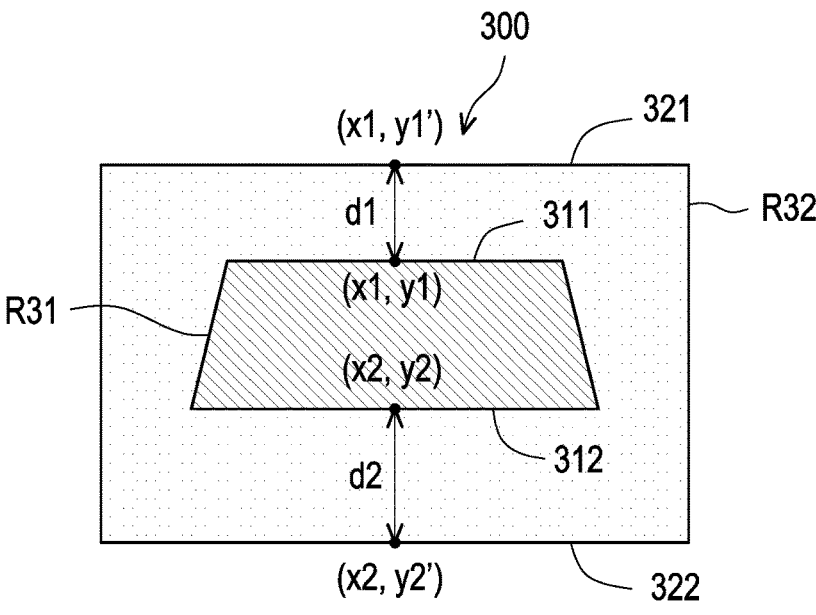
FIG. 3B is a schematic diagram of a captured image according to an embodiment of the disclosure.

For example, FIG. 3A is a schematic side view of a projection range and a capturing range according to an embodiment of the disclosure. FIG. 3B is a schematic diagram of a captured image according to an embodiment of the disclosure. With reference to FIG. 3A and FIG. 3B, a capturing range 320 of the image-capturing device 120 is set to be greater than a projection range 310 of the projection device 110, and the projection range 310 is set to be within the capturing range 320. The projection device 110 projects an image 330 on the projection target P, and a captured image 300 may be obtained by the image-capturing device 120 as shown in FIG. 3B.

Since the capturing range 320 of the image-capturing device 120 includes the projection range 310 of the projection device 110 therewithin, the captured image 300 obtained by the image-capturing device 120 includes a projected image region (i.e., a target object R31) corresponding to the projected image 330 and a non-projected image region R32 (a region excluding the target object R31 in the captured image 300) corresponding to non-projected images 340 and 350.

With reference back to FIG. 2, after the captured image 300 is obtained, in step S215, the processing unit 130 calculates a projection position of the target object R31 in the captured image 300 based on the target object R31 and the captured image 300. Here, in terms of the captured image 300 of FIG. 3B, the target object R31 is a projected image region corresponding to the projected image 330. In an embodiment, the processing unit 130 may perform an image recognition process on the captured image 300 to identify a bounding box (boundaries) of the target object R31 (a projected image region) in the captured image 300, and then calculate the projection position of the target object R31 in the captured image 300 by utilizing the bounding box and the edges of the captured image 300.

Next, for the projected image being a calibration image or a startup image, examples are provided to describe the identification method of the bounding box.

Figure 4A:
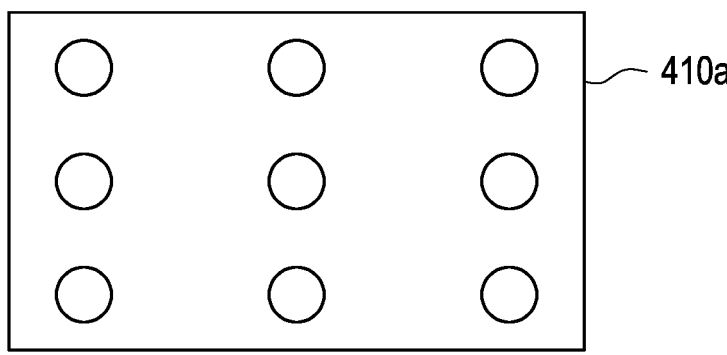
FIG. 4A is a schematic diagram of an example of a calibration image according to an embodiment of the disclosure.
Figure 4B:
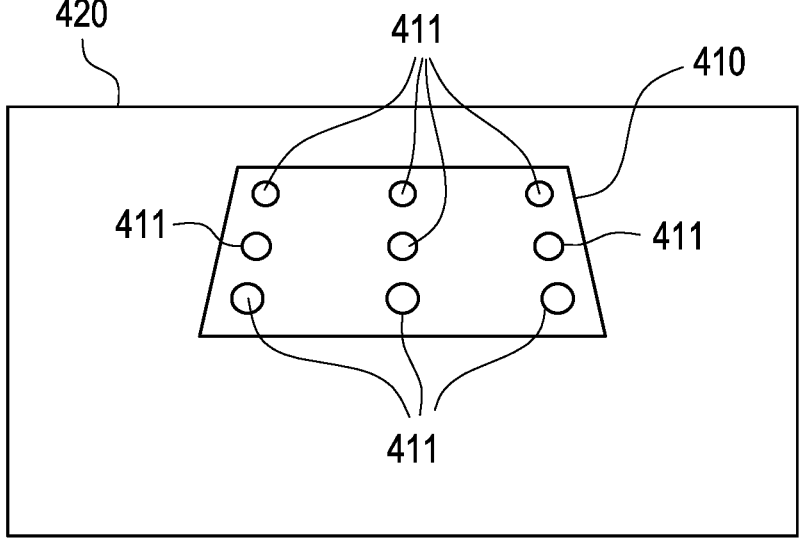
FIG. 4B is a schematic diagram of a captured image according to an embodiment of the disclosure.
Figure 5:
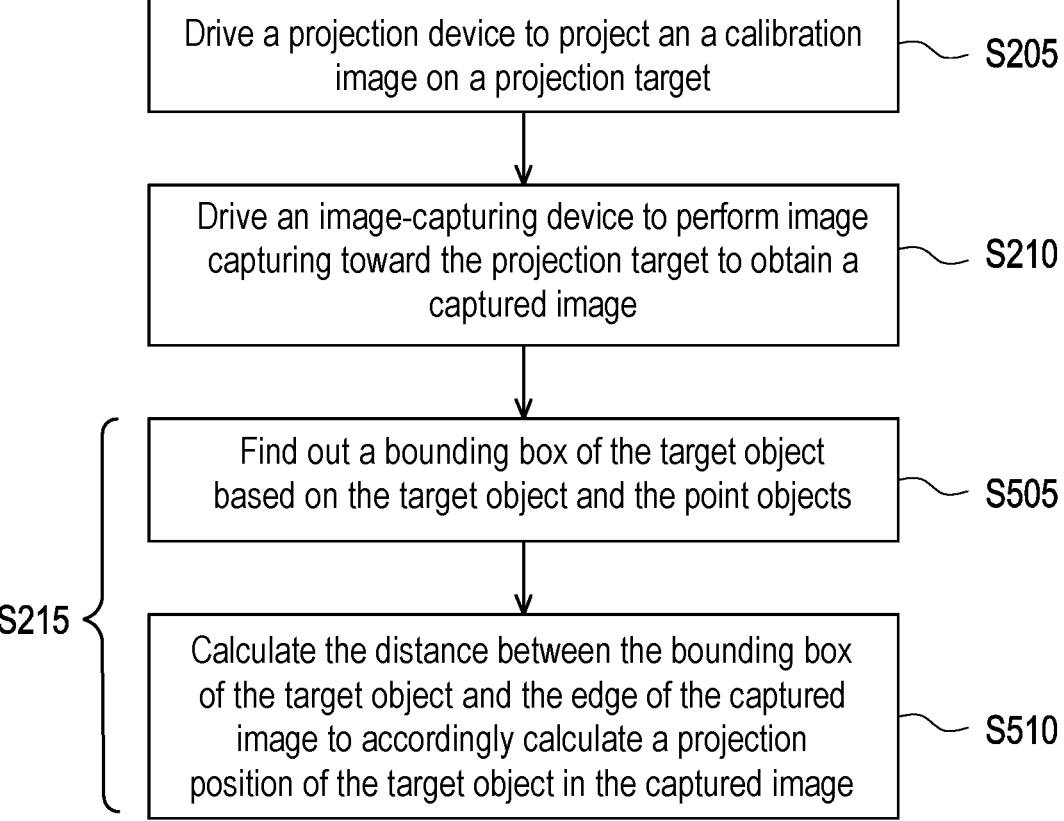
FIG. 5 is a flowchart of calculating a projection position of a target object according to an embodiment of the disclosure.

First, FIG. 2, FIG. 4A, FIG. 4B, and FIG. 5 are taken for describing image processing flows of the projection system 100 in the calibration mode. FIG. 4A is a schematic diagram of an example of a calibration image according to an embodiment of the disclosure. FIG. 4B is a schematic diagram of a captured image according to an embodiment of the disclosure. FIG. 5 is a flowchart of calculating a projection position of a target object according to an embodiment of the disclosure.

In the calibration mode, in step S205, a calibration image 410a (the image 330) is projected on the projection target by the projection device 110. Here, the calibration image 410a includes 9 calibration points, for example. Here, the pattern of the calibration point is not limited to a circle as long as the point position can be recognized from the pattern.

Next, in step S210, the processing unit 130 drives the image-capturing device 120 to perform image capturing toward the projection target to obtain a captured image 420. As shown in FIG. 4B, the captured image 420 includes a target object 410 corresponding to the calibration image 410a and point objects 411 corresponding to the calibration points.

Next, step S215 includes step S505 and step S510. In step S505, the processing unit 130 finds out a bounding box of the target object 410 based on the target object 410 and the point objects 411. For example, based on coordinate positions of the calibration points of the calibration image 410a in the coordinate system of the projection device 110 and by position offset amounts of the 9 calibration points, the processing unit 130 calculates coordinate positions of the point objects 411 in the coordinate system of the image-capturing device 120. However, in the embodiments of the disclosure, calculation of the coordinate positions is not limited thereto. After that, the position (region) of the target object 410 in the captured image 420 is calculated from the coordinate positions of the point objects 411 in the coordinate system of the image-capturing device 120 to obtain the bounding box of the target object 410. After that, in step S510, the distance between the bounding box of the target object 410 and the edge of the captured image 420 is calculated to accordingly calculate a projection position of the target object 410 in the captured image 420.

Figure 6A:
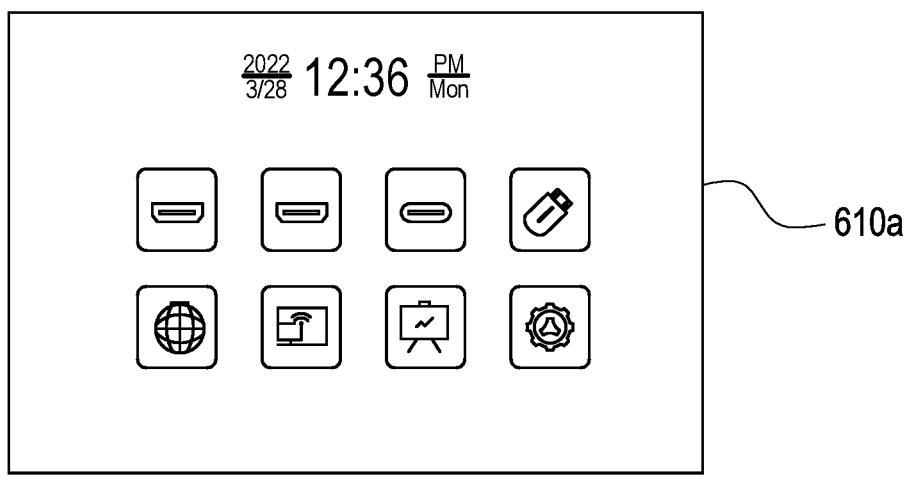
FIG. 6A is a schematic diagram of an example of a startup image according to an embodiment of the disclosure.
Figure 6B:
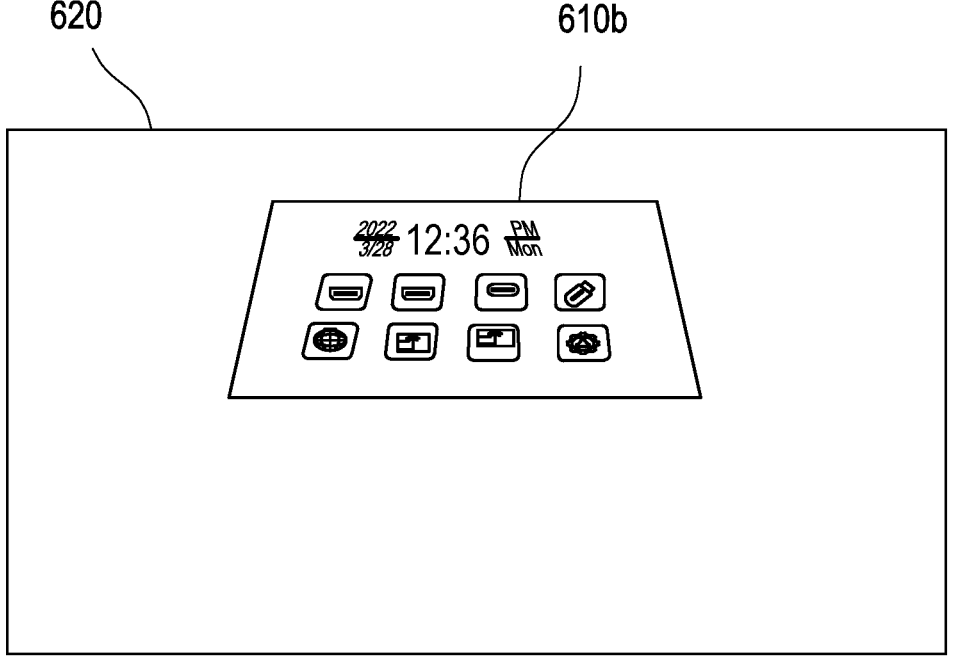
FIG. 6B is a schematic diagram of a captured image according to an embodiment of the disclosure.

In addition, FIG. 2, FIG. 6A, FIG. 6B, and FIG. 7 are taken for describing image processing flows of the projection system 100 in a startup state. FIG. 6A is a schematic diagram of an example of a startup image according to an embodiment of the disclosure. FIG. 6B is a schematic diagram of a captured image according to an embodiment of the disclosure. FIG. 7 is a flowchart of calculating a projection position of a target object according to an embodiment of the disclosure.

In the startup state, in step S205, a startup image 610a (the image 330) is projected on the projection target by the projection device 110. Here, the startup image 610a may use an image with a solid-colored background (the startup image 610a may include different display patterns), but the disclosure is not limited thereto. Next, in step S210, the processing unit 130 drives the image-capturing device 120 to perform image capturing toward the projection target to obtain a captured image 620. As shown in FIG. 6B, the captured image 620 includes a target object 610b corresponding to the startup image 610a and a non-projected image region (a region excluding the target object 610b in the captured image 620) not corresponding to the startup image 610a.

Next, step S215 includes step S705 and step S710. In step S705, a bounding box of the target object 610b is found out based on the target object 610b and the non-projected image region.

In this embodiment, since the startup image 610a adopts a solid-colored background, accordingly, the background color of the target object 610b presented in the captured image 620 is different from the color of the non-projected image region. Accordingly, the bounding box of the target object 610b may be found out through edge detection. In addition, since the startup image 610a adopts a solid-colored background, a group of preset color values (including three preset reference values of the three color components of R, G, and B) may also be set in the projection system 100 in advance, and the pixels in the startup image 610a whose color components (R, G, B) are respectively greater than or equal to the corresponding preset reference values are regarded as the non-projected image region to accordingly find out the bounding box of the target object 610b. Alternatively, the difference between the color components of two adjacent pixels in the startup image 610a is calculated, and if the difference is greater than a preset difference, it indicates that the two pixels are located at opposite sides of the bounding box.

After the bounding box of the target object 610b is obtained, a projection position may be further calculated. Specifically, in step S710, the processing unit 130 calculates the distance between the bounding box of the target object 610b and the edge of the captured image 620 to accordingly calculate the projection position of the target object 610b in the captured image 620. In other words, two boundaries of the bounding box in a first direction (a vertical direction or a horizontal direction) are extracted, and the edge distances between the two boundaries and the edges of the captured image 620 are calculated to accordingly calculate the projection position. The first direction is parallel to a connecting line of the image-capturing device 120 and the projection lens (e.g., the center of the lens) of the projection device 110. When the image-capturing device 120 is disposed above or below the projection lens of the projection device 110, the first direction is a vertical direction (as shown in FIG. 3A). When the image-capturing device 120 is disposed at the left or right side of the projection lens of the projection device 110, the first direction is a horizontal direction.

To be specific, the steps of calculating the projection position will be described below. FIG. 8 is a flowchart of calculating a projection position according to an embodiment of the disclosure. With reference to FIG. 3B and FIG. 8, step S510 (and step S710) may include step S805 to step S820. In this embodiment, the image-capturing device 120 is disposed above or below the projection device 110. In step S805, a first object boundary 311 and a second object boundary 312 of the bounding box R31 in the first direction (a vertical direction) are extracted according to the bounding box of the target object R31. Next, in step S810, the processing unit 130 calculates a first edge distance d1 between the first object boundary 311 and a first image boundary 321 of the captured image 300 (adjacent) in the first direction (e.g., a minimum distance between the center point of the first object boundary 311 and the first image boundary 321). After that, in step S815, the processing unit 130 calculates a second edge distance d2 between the second object boundary 312 and a second image boundary 322 of the captured image 300 (adjacent) in the first direction (e.g., a minimum distance between the center point of the second object boundary 312 and the second image boundary 322). For example, four corner points of the bounding box of the target object R31 are calculated. After that, the coordinate positions of the four corner points are utilized to calculate coordinate positions (x1, y1) and (x2, y2) of the respective center points of the first object boundary 311 and the second object boundary 312. Based on the X-axis coordinate values of the center points of the first object boundary 311 and the second object boundary 312, coordinate positions (x1, y1'), (x2, y2') of the same X-axis coordinate values of the first image boundary 321 and the second image boundary 322 are obtained. Accordingly, the first edge distance d1 (y1'-y1) and the second edge distance d2 (y2-y2') may be calculated. Lastly, in step S820, the processing unit 130 calculates the projection position based on the first edge distance d1 and the second edge distance d2. In an embodiment, a position ratio of the target object R31 in a vertical direction is calculated with the first edge distance d1 and the second edge distance d2, namely the position ratio=d1/d2.

In this embodiment, the processing unit 130 obtains the projection position by calculating the ratio (position ratio) of the two symmetrically disposed boundaries of the target object R31 respectively distanced from the two image boundaries of the captured image 300. In other words, in this embodiment, the projection position is represented by the position ratio, and the position ratio is directly proportional or inversely proportional to the size of the actually projected image 330. Accordingly, the size of the actually projected image 330 may be estimated accordingly. For example, when the projection lens of the projection device 110 is a fixed-focus lens (e.g., an ultra-short-focus lens), the size of the image 330 is directly proportional to the projection distance from the projection device 110 to the projection target, and the position ratio also differs at different projection distances, so the size of the image 330 may be calculated from the position ratio; when the projection lens of the projection device 110 is a zoom lens, the position ratio also differs under different focal lengths and different projection distances, so the size of the image 330 may be calculated from the position ratio.

Figure 9:
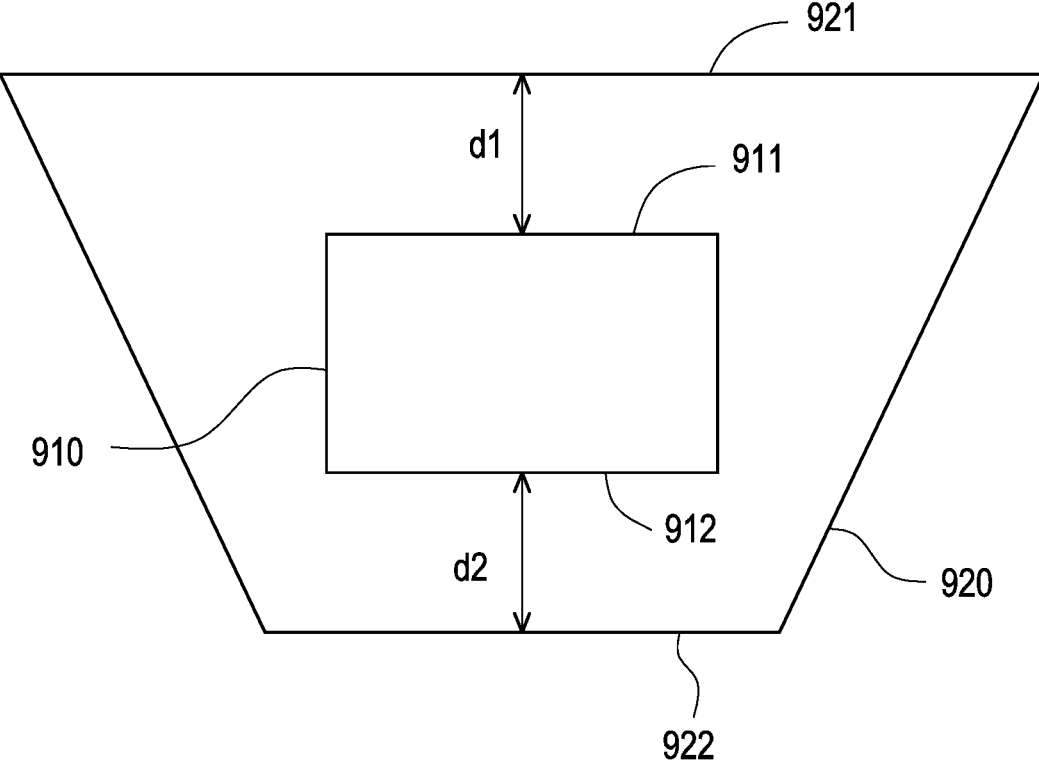
FIG. 9 is a schematic diagram illustrating calculation of a projection position according to another embodiment of the disclosure.

In other embodiments, the captured image may be pre-processed before the projection position is calculated. For example, FIG. 9 is a schematic diagram illustrating calculation of a projection position according to another embodiment of the disclosure. In this embodiment, the target object R31 of the captured image 300 shown in FIG. 3B is converted into a target object 910 represented by a rectangle as shown in FIG. 9, and the captured image 300 is converted in equal proportion into a captured image 920 (trapezoid) as shown in FIG. 9. A first object boundary 911, a second object boundary 912, a first image boundary 921, and a second image boundary 922 shown in FIG. 9 respectively correspond to the first object boundary 311, the second object boundary 312, the first image boundary 321, and the second image boundary 322 shown in FIG. 3B. For example, Table 1 shows the proportional relationships between upper and lower sides of the projected image and the capturing range in various scenarios where the image is projected in different sizes when the image-capturing device 120 is disposed above or below the projection device 110.

TABLE 1

| Size of projected image | 50 inches | 80 inches | 110 inches |
|---|---|---|---|
| Position ratio | 87.39% | 93.29% | 96.08% |

As shown in Table 1, when the projected image projected by the projection device 110 has a size of 50 inches, the position ratio of its projection position in the vertical direction is 87.39%; when the image projected by the projection device 110 has a size of 80 inches, the position ratio of its projection position in the vertical direction is 93.29%; when the image projected by the projection device 110 has a size of 110 inches, the position ratio of its projection position in the vertical direction is 96.08%. As such, the position ratio of d1/d2 increases as the size of the projected image increases (the position ratio in the embodiment of Table 1 is directly proportional to the size of the actually projected image). Here, the numerical values shown in Table 1 only serve for exemplary description, and the disclosure is not limited thereto. According to the above, the position ratio may be used as a criterion for determining the size of the actually projected image. When the position ratio is relatively small, it is determined that the projected image is relatively small.

The embodiment is described with a context where the image-capturing device 120 is located directly below the projection device 110 (the projection lens), while the same effect can also be achieved if the image-capturing device 120 is located directly above the projection device 110 (the projection lens). If the image-capturing device 120 is located at the left or right side of the projection device 110 (the projection lens) in the horizontal direction with the same inclination angle of the image-capturing device 120 and the same offset value of the projection device 110, it is required to calculate the distance between the left and right sides instead.

Due to different offset values of the projection lenses of different projection devices 110, and also tolerances in the mounting of the camera and the projection lens of the image-capturing device 120, the projection device 110 and the image-capturing device 120 may require calibration before leaving the factory. For example, a coordinate system transformation relationship between the coordinate system of the projection device 110 and the coordinate system of the image-capturing device 120 is pre-stored in the projection device 110 for transformation of the coordinate relationship in subsequent applications.

With reference to FIG. 2 again, after calculating the projection position (the position ratio), in step S220, the processing unit 130 adjusts an output power of the illumination light source module of the projection device 110 based on the projection position and an ambient luminance. Here, the projection system 100 also includes a sensor for detecting the ambient luminance.

In an embodiment, the processing unit 130 finds out the corresponding light source output power in a look-up table to adjust the output power of the illumination light source module based on the projection position and the ambient luminance. The processing unit 130 looks up the corresponding output power according to the look-up table including a plurality of projection position ranges and a plurality of ambient luminance ranges. For example, the look-up table shown in Table 2 includes a plurality of projection position ranges, a plurality of ambient luminance ranges, and a plurality of output powers, where luminance values L1>L2>L3, and position ratios PR1>PR2>PR3. In addition, L2-L1 represent a range less than L2 and greater than or equal to L1, PR2-PR1 represent a range less than PR2 and greater than or equal to PR1, and so on and so forth.

TABLE 2

| Projection position range | Ambient luminance range | | | |
|---|---|---|---|---|
| | >L1 | L2~L1 | L3~L2 | <L3 |
| >PR1 | 100% | 94% | 88% | 82% |
| PR2~PR1 | 94% | 88% | 82% | 76% |
| PR3~PR2 | 88% | 82% | 76% | 70% |
| <PR3 | 82% | 76% | 70% | 64% |

Through the look-up table, it is possible to find out which projection position range the projection position is located in and which ambient luminance range the ambient luminance is located in, to find out the corresponding output power. For example, assuming that the projection position is within PR2-PR1 and the ambient luminance is within L2-L1, then an output power of 88% is obtained.

In other embodiments, the look-up table may also be set for looking up a projection luminance. For example, through the look-up table, it is possible to find out which projection position range the projection position is located in and which ambient luminance range the ambient luminance is located in, to find out the corresponding projection luminance. After that, the amount to be increased or decreased for the output power of the illumination light source module is calculated based on the projection luminance.

In actual applications, the projection system 100 may be set to utilize the startup image 610*a* to adjust the output power of the illumination light source module at startup, and/or utilize the calibration image 410*a* to adjust the output power of the illumination light source module in the calibration mode. In addition, it is also possible to further set that, under the circumstances where the output power has been adjusted at startup and/or in the calibration mode, when movement of the position of the projection system 100 is detected, the output power of the illumination light source module is adjusted again by utilizing the startup image 610*a*, the calibration image 410*a*, or other solid-colored images, or that the user initiates the process flows of adjusting the output power of the illumination light source module. Alternatively, it is possible to set that the output power of the illumination light source module is automatically adjusted when it is detected that the change in the ambient luminance exceeds a set range and/or the change in the size of the projected image exceeds another set range.

In addition, in terms of a projection system with a touch function, it is possible to further set that, before the touch function is used, the output power of the illumination light source module is adjusted by utilizing the startup image 610*a*, the calibration image 410*a*, a touch calibration image (e.g., an invisible light image), or other solid-colored images. Alternatively, it is possible to set that the output power of the illumination light source module is automatically adjusted when it is detected that the change in the ambient luminance exceeds a set range and/or the change in the size of the projected image exceeds another set range.

In summary of the foregoing, in the embodiments of the disclosure, the image-capturing device is utilized photograph the projection target to obtain the captured image when the imaging range is greater than the projection range, the size of the actually projected image is estimated based on the analysis of the distance from the target object corresponding to the actual projection region in the captured image to the edge of the captured image, and the size of the image is used with the ambient luminance to feed back the appropriate output power of the illumination light source module.

In addition, in the embodiments of the disclosure, the look-up table is utilized to obtain the output power, so subsequent maintenance only requires adjusting the output power within the ambient luminance ranges and the projection position ranges. Since a plurality of ranges are set in the look-up table for the ambient luminance and the projection position, the luminance of the image is not adjusted excessively frequently, and good viewing quality can be maintained.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A method for adjusting a projection system comprising:
   driving a projection device to project an image on a projection target;
   driving an image-capturing device to perform image capturing toward the projection target to obtain a captured image, wherein the captured image comprises a target object corresponding to the image;
   calculating a projection position of the target object in the captured image based on the target object and the captured image; and
   adjusting an output power of an illumination light source module of the projection device based on the projection position and an ambient luminance.

2. The method according to claim 1, wherein adjusting the output power of the illumination light source module of the projection device based on the projection position and the ambient luminance comprises:
   finding out the corresponding output power in a look-up table to adjust the output power of the illumination light source module based on the projection position and the ambient luminance.

3. The method according to claim 2, wherein finding out the corresponding output power in the look-up table comprises:
   finding out the corresponding output power according to the look-up table, wherein the look-up table comprises a plurality of projection position ranges and a plurality of ambient luminance ranges, the ambient luminance ranges correspond to the ambient luminance, and the plurality of projection position ranges correspond to the projection position.

4. The method according to claim 1, wherein calculating the projection position of the target object in the captured image based on the target object and the captured image comprises:

finding out a bounding box of the target object to extract a first object boundary and a second object boundary of the bounding box in a first direction;

calculating a first edge distance between the first object boundary and a first image boundary of the captured image in the first direction;

calculating a second edge distance between the second object boundary and a second image boundary of the captured image in the first direction; and calculating the projection position based on the first edge distance and the second edge distance.

5. The method according to claim 4, wherein the first direction is parallel to a connecting line of the image-capturing device and a projection lens of the projection device.

6. The method according to claim 4, wherein the image is a startup image, and the captured image obtained by the image-capturing device comprises the target object corresponding to the startup image and a non-projected image region not corresponding to the startup image, wherein, after obtaining the captured image, the method further comprises:

finding out the bounding box of the target object based on the target object and the non-projected image region.

7. The method according to claim 4, wherein the image is a calibration image, the calibration image comprises a plurality of calibration points, and the captured image obtained by the image-capturing device comprises the target object corresponding to the calibration image and a plurality of point objects corresponding to the plurality of calibration points, wherein, after obtaining the captured image, the method further comprises:

finding out the bounding box of the target object based on the target object and the point objects.

8. The method according to claim 1, wherein a coordinate system transformation relationship between the projection device and the image-capturing device is pre-stored in the projection device.

9. A projection system comprising:

a projection device, comprising an illumination light source module, and used for projection on a projection target;

an image-capturing device, used for performing image capturing toward the projection target; and a processing unit, coupled to the projection device and the image-capturing device, and configured to:

drive the projection device to project an image on the projection target;

drive the image-capturing device to perform image capturing toward the projection target to obtain a captured image, wherein the captured image comprises a target object corresponding to the image;

calculate a projection position of the target object in the captured image based on the target object and the captured image; and adjust an output power of the illumination light source module of the projection device based on the projection position and an ambient luminance.

10. The projection system according to claim 9, wherein the processing unit is configured to:

find out the corresponding output power in a look-up table to adjust the output power of the illumination light source module based on the projection position and the ambient luminance.

11. The projection system according to claim 10, wherein the processing unit is configured to:

find out the corresponding output power according to the look-up table, wherein the look-up table comprises a plurality of projection position ranges and a plurality of ambient luminance ranges, the ambient luminance ranges correspond to the ambient luminance, and the plurality of projection position ranges correspond to the projection position.

12. The projection system according to claim 9, wherein the processing unit is configured to:

find out a bounding box of the target object to extract a first object boundary and a second object boundary of the bounding box in a first direction;

calculate a first edge distance between the first object boundary and a first image boundary of the captured image in the first direction;

calculate a second edge distance between the second object boundary and a second image boundary of the captured image in the first direction; and calculate the projection position based on the first edge distance and the second edge distance.

13. The projection system according to claim 12, wherein the first direction is parallel to a connecting line of the image-capturing device and a projection lens of the projection device.

14. The projection system according to claim 12, wherein the image is a startup image, the captured image obtained by the image-capturing device comprises the target object corresponding to the startup image and a non-projected image region not corresponding to the startup image, and the processing unit is configured to:

find out the bounding box of the target object based on the target object and the non-projected image region.

15. The projection system according to claim 12, wherein the image is a calibration image, the calibration image comprises a plurality of calibration points, the captured image obtained by the image-capturing device comprises the target object corresponding to the calibration image and a plurality of point objects corresponding to the plurality of calibration points, and the processing unit is configured to:

find out the bounding box of the target object based on the target object and the point objects.

16. The projection system according to claim 9, wherein a coordinate system transformation relationship between the projection device and the image-capturing device is pre-stored in the projection device.

* * * * *